(12) United States Patent
Raman et al.

(10) Patent No.: US 8,999,020 B2
(45) Date of Patent: Apr. 7, 2015

(54) PROCESSES FOR THE SEPARATION OF METHANE FROM A GAS STREAM

(75) Inventors: Pattabhi K. Raman, Long Grove, IL (US); Francis S. Lau, Darien, IL (US); Earl T. Robinson, Lakeland, FL (US)

(73) Assignee: GreatPoint Energy, Inc., Cambridge, MA (US)

( * ) Notice: Subject to any disclaimer, the term of this patent is extended or adjusted under 35 U.S.C. 154(b) by 1502 days.

(21) Appl. No.: 12/415,042

(22) Filed: Mar. 31, 2009

(65) Prior Publication Data

US 2009/0259080 A1 Oct. 15, 2009

Related U.S. Application Data

(60) Provisional application No. 61/041,307, filed on Apr. 1, 2008.

(51) Int. Cl.
| | | |
|---|---|---|
| *C10J 3/46* | (2006.01) | |
| *C10J 3/00* | (2006.01) | |
| *C01B 3/34* | (2006.01) | |
| *C01B 3/52* | (2006.01) | |
| *C01B 3/58* | (2006.01) | |
| *C10J 3/48* | (2006.01) | |
| *C10J 3/72* | (2006.01) | |
| *C10J 3/82* | (2006.01) | |
| *C10K 3/04* | (2006.01) | |
| *C10L 3/08* | (2006.01) | |
| *C10L 3/10* | (2006.01) | |
| *F25J 3/02* | (2006.01) | |

(52) U.S. Cl.
CPC ... *C10J 3/00* (2013.01); *C01B 3/34* (2013.01); *C01B 3/52* (2013.01); *C01B 3/58* (2013.01); C01B 2203/0205 (2013.01); C01B 2203/0283 (2013.01); C01B 2203/0405 (2013.01); C01B 2203/0415 (2013.01); C01B 2203/0435 (2013.01); C01B 2203/0465 (2013.01); C01B 2203/047 (2013.01); C01B 2203/0475 (2013.01); C01B 2203/048 (2013.01); C01B 2203/0485 (2013.01); C01B 2203/06 (2013.10); C01B 2203/1241 (2013.01); C01B 2203/84 (2013.01); *C10J 3/482* (2013.01); *C10J 3/72* (2013.01); *C10J 3/82* (2013.01); C10J 2300/0903 (2013.01); C10J 2300/0973 (2013.01); C10J 2300/0986 (2013.01); C10J 2300/1662 (2013.01); C10J 2300/1807 (2013.01); C10J 2300/1823 (2013.01); C10J 2300/1853 (2013.01); *C10K 3/04* (2013.01); *C10L 3/08* (2013.01); *C10L 3/10* (2013.01); *F25J 3/0223* (2013.01); *F25J 3/0233* (2013.01); *F25J 3/0252* (2013.01); *F25J 3/0261* (2013.01); *F25J 3/0271* (2013.01); F25J 2205/40 (2013.01); F25J 2205/80 (2013.01); F25J 2245/02 (2013.01)

(58) Field of Classification Search
USPC ........... 585/3, 310; 48/197 R, 202, 206, 209, 48/210, 214 A, DIG. 7, 200
See application file for complete search history.

(56) References Cited

U.S. PATENT DOCUMENTS

| | | |
|---|---|---|
| 2,813,126 A | 11/1957 | Tierney |
| 2,886,405 A | 5/1959 | Benson et al. |
| 3,034,848 A | 5/1962 | King |
| 3,114,930 A | 12/1963 | Oldham et al. |
| 3,164,330 A | 1/1965 | Neidl |
| 3,435,590 A | 4/1969 | Smith |
| 3,531,917 A | 10/1970 | Grunewald et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |

(Continued)

FOREIGN PATENT DOCUMENTS

| | | |
|---|---|---|
| CA | 966660 | 4/1975 |
| CA | 1003217 | 1/1977 |

(Continued)

OTHER PUBLICATIONS

U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Adsorption, http://en.wikipedia.org/wiki/Adsorption, pp. 1-8.
Amine gas treating, http://en.wikipedia.org/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
(Continued)

*Primary Examiner* — Randy Boyer
(74) *Attorney, Agent, or Firm* — McDonnell Boehnen Hulbert & Berghoff LLP (57) ABSTRACT

Processes for the catalytic conversion of a carbonaceous composition into a gas stream comprising methane are provided. In addition, the processes provide for the generation of a hydrogen-enriched gas stream and, optionally, a carbon monoxide-enriched gas stream, which can be mixed or used separately as an energy source for subsequent catalytic gasification processes.

20 Claims, 1 Drawing Sheet

(56) References Cited

U.S. PATENT DOCUMENTS

| | | |
|---|---|---|
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovich et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Calvin et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A * | 10/1989 | Henley et al. ............... 48/197 R |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,236,557 A | 8/1993 | Muller et al. |
| 5,250,083 A | 10/1993 | Wolfenbarger et al. |
| 5,277,884 A | 1/1994 | Shinnar et al. |
| 5,435,940 A | 7/1995 | Doering et al. |
| 5,536,893 A | 7/1996 | Gudmundsson |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,670,122 A | 9/1997 | Zamansky et al. |
| 5,720,785 A | 2/1998 | Baker |
| 5,733,515 A | 3/1998 | Doughty et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |

(56) References Cited

U.S. PATENT DOCUMENTS

| | | | |
|---|---|---|---|
| 6,015,104 | A | 1/2000 | Rich, Jr. |
| 6,028,234 | A | 2/2000 | Heinemann et al. |
| 6,090,356 | A | 7/2000 | Jahnke et al. |
| 6,132,478 | A | 10/2000 | Tsurui et al. |
| 6,180,843 | B1 | 1/2001 | Heinemann et al. |
| 6,187,465 | B1 | 2/2001 | Galloway |
| 6,379,645 | B1 | 4/2002 | Bucci et al. |
| 6,389,820 | B1 | 5/2002 | Rogers et al. |
| 6,506,349 | B1 | 1/2003 | Khanmamedov |
| 6,506,361 | B1 | 1/2003 | Machado et al. |
| 6,602,326 | B2 | 8/2003 | Lee et al. |
| 6,641,625 | B1 | 11/2003 | Clawson et al. |
| 6,653,516 | B1 | 11/2003 | Yoshikawa et al. |
| 6,692,711 | B1 | 2/2004 | Alexion et al. |
| 6,790,430 | B1 | 9/2004 | Lackner et al. |
| 6,797,253 | B2 | 9/2004 | Lyon |
| 6,808,543 | B2 | 10/2004 | Paisley |
| 6,855,852 | B1 | 2/2005 | Jackson et al. |
| 6,878,358 | B2 | 4/2005 | Vosteen et al. |
| 6,894,183 | B2 | 5/2005 | Choudhary et al. |
| 6,955,695 | B2 | 10/2005 | Nahas |
| 6,969,494 | B2 | 11/2005 | Herbst |
| 7,074,373 | B1 | 7/2006 | Warren et al. |
| 7,132,183 | B2 | 11/2006 | Galloway |
| 7,205,448 | B2 | 4/2007 | Gajda et al. |
| 7,220,502 | B2 | 5/2007 | Galloway |
| 7,309,383 | B2 | 12/2007 | Beech, Jr. et al. |
| 7,897,126 | B2 | 3/2011 | Rappas et al. |
| 7,901,644 | B2 | 3/2011 | Rappas et al. |
| 7,922,782 | B2 | 4/2011 | Sheth |
| 7,926,750 | B2 | 4/2011 | Hauserman |
| 7,976,593 | B2 | 7/2011 | Graham |
| 2002/0036086 | A1 | 3/2002 | Minkkinen et al. |
| 2003/0131582 | A1 | 7/2003 | Anderson et al. |
| 2003/0167691 | A1 | 9/2003 | Nahas |
| 2004/0020123 | A1 | 2/2004 | Kimura et al. |
| 2004/0180971 | A1 | 9/2004 | Inoue et al. |
| 2005/0107648 | A1 | 5/2005 | Kimura et al. |
| 2005/0137442 | A1 | 6/2005 | Gajda et al. |
| 2005/0287056 | A1 | 12/2005 | Baker et al. |
| 2006/0265953 | A1 | 11/2006 | Hobbs |
| 2007/0000177 | A1 | 1/2007 | Hippo et al. |
| 2007/0051043 | A1 | 3/2007 | Schingnitz |
| 2007/0083072 | A1 | 4/2007 | Nahas |
| 2007/0180990 | A1 | 8/2007 | Downs et al. |
| 2007/0186472 | A1 | 8/2007 | Rabovitser et al. |
| 2007/0237696 | A1 | 10/2007 | Payton |
| 2007/0277437 | A1 | 12/2007 | Sheth |
| 2007/0282018 | A1 | 12/2007 | Jenkins |
| 2009/0048476 | A1 | 2/2009 | Rappas et al. |
| 2009/0090055 | A1 | 4/2009 | Ohtsuka |
| 2009/0090056 | A1 | 4/2009 | Ohtsuka |
| 2009/0165361 | A1 | 7/2009 | Rappas et al. |
| 2009/0165376 | A1 | 7/2009 | Lau et al. |
| 2009/0165379 | A1 | 7/2009 | Rappas |
| 2009/0165380 | A1 | 7/2009 | Lau et al. |
| 2009/0165381 | A1 | 7/2009 | Robinson |
| 2009/0165382 | A1 | 7/2009 | Rappas et al. |
| 2009/0165383 | A1 | 7/2009 | Rappas et al. |
| 2009/0165384 | A1 | 7/2009 | Lau et al. |
| 2009/0166588 | A1 | 7/2009 | Spitz et al. |
| 2009/0169448 | A1 | 7/2009 | Rappas et al. |
| 2009/0169449 | A1 | 7/2009 | Rappas et al. |
| 2009/0170968 | A1 | 7/2009 | Nahas et al. |
| 2009/0173079 | A1 | 7/2009 | Wallace et al. |
| 2009/0217575 | A1 | 9/2009 | Raman et al. |
| 2009/0217582 | A1 | 9/2009 | May et al. |
| 2009/0217584 | A1 | 9/2009 | Raman et al. |
| 2009/0217585 | A1 | 9/2009 | Raman et al. |
| 2009/0217586 | A1 | 9/2009 | Rappas et al. |
| 2009/0217587 | A1 | 9/2009 | Raman et al. |
| 2009/0217588 | A1 | 9/2009 | Hippo et al. |
| 2009/0217589 | A1 | 9/2009 | Robinson |
| 2009/0217590 | A1 | 9/2009 | Rappas et al. |
| 2009/0218424 | A1 | 9/2009 | Hauserman |
| 2009/0220406 | A1 | 9/2009 | Rahman |
| 2009/0229182 | A1 | 9/2009 | Raman et al. |
| 2009/0246120 | A1 | 10/2009 | Raman et al. |
| 2009/0259080 | A1 | 10/2009 | Raman et al. |
| 2009/0260287 | A1 | 10/2009 | Lau |
| 2009/0324458 | A1 | 12/2009 | Robinson et al. |
| 2009/0324459 | A1 | 12/2009 | Robinson et al. |
| 2009/0324460 | A1 | 12/2009 | Robinson et al. |
| 2009/0324461 | A1 | 12/2009 | Robinson et al. |
| 2009/0324462 | A1 | 12/2009 | Robinson et al. |
| 2010/0071235 | A1 | 3/2010 | Pan et al. |
| 2010/0071262 | A1 | 3/2010 | Robinson et al. |
| 2010/0076235 | A1 | 3/2010 | Reiling et al. |
| 2010/0120926 | A1 | 5/2010 | Robinson et al. |
| 2010/0121125 | A1 | 5/2010 | Hippo et al. |
| 2010/0168494 | A1 | 7/2010 | Rappas et al. |
| 2010/0168495 | A1 | 7/2010 | Rappas et al. |
| 2010/0179232 | A1 | 7/2010 | Robinson et al. |
| 2010/0287835 | A1 | 11/2010 | Reiling et al. |
| 2010/0287836 | A1 | 11/2010 | Robinson et al. |
| 2010/0292350 | A1 | 11/2010 | Robinson et al. |
| 2011/0031439 | A1 | 2/2011 | Sirdeshpande et al. |
| 2011/0062012 | A1 | 3/2011 | Robinson |
| 2011/0062721 | A1 | 3/2011 | Sirdeshpande et al. |
| 2011/0062722 | A1 | 3/2011 | Sirdeshpande et al. |
| 2011/0064648 | A1 | 3/2011 | Preston et al. |
| 2011/0088896 | A1 | 4/2011 | Preston |
| 2011/0088897 | A1 | 4/2011 | Raman |
| 2011/0146978 | A1 | 6/2011 | Perlman |
| 2011/0146979 | A1 | 6/2011 | Wallace |

FOREIGN PATENT DOCUMENTS

| | | |
|---|---|---|
| CA | 1106178 | 8/1981 |
| CA | 1 125 026 | 6/1982 |
| CA | 1187702 | 6/1985 |
| CN | 1477090 | 2/2004 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0 723 930 | 7/1996 |
| EP | 1 001 002 | 5/2000 |
| EP | 1 207 132 | 5/2002 |
| EP | 1 741 673 | 6/2006 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 2078251 | 1/1982 |
| GB | 2154600 | 9/1985 |
| GB | 2455864 | 6/2009 |
| JP | 54020003 | 2/1979 |
| JP | 56157493 | 12/1981 |
| JP | 62241991 | 10/1987 |
| JP | 62 257985 | 11/1987 |
| JP | 2000290659 | 10/2000 |

(56) References Cited

FOREIGN PATENT DOCUMENTS

| JP | 2000290670 | 10/2000 |
|---|---|---|
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/79355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/063608 | 6/2011 |

OTHER PUBLICATIONS

Deepak Tandon, Dissertation Approval, "Low Temperature and Elevated Pressure Steam Gasification of Illinois Coal", Jun. 13, 1996.

Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm, pp. 1-5.
Gas separation, http://en.wikipedia.org/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char, *Biomass and Bioenergy*, vol. 20, pp. 447-457, (2001).
Mengjie, et al., "A potential renewable energy resource development and utilization of biomass energy", http://www.fao.org.docrep/T4470E/t4470e0n.htm, pp. 1-8.
Meyers, et al. Fly Ash as a Construction Material for Highways, A Manual. Federal Highway Administration, Report No. FHWA-IP-76-16, Washington, DC, 1976.
Coal Bottom Ash/Boiler Slag, http://www.p2pays.org/ref/13/12842/cbabs2.htm.
Natural gas processing, http://en.wikipedia.org/wiki/Natural_gas_processing, pp. 1-4.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Reboiler, http://en.wikipedia.org/wiki/Reboiler, pp. 1-4.
What is XPS?, http://www.nuance.northwestern.edu/KeckII/xps1.asp, pp. 1-2.
2.3 Types of gasifiers, http://www.fao.org/docrep/t0512e/T0512e0a.htm, pp. 1-6.
2.4 Gasification fuels, http://www.fao.org/docrep/t0512e/T0512e0b.htm#TopofPage, pp. 1-8.
2.5 Design of downdraught gasifiers, http://www.fao.org/docrep/t0512e/T0512e0c.htm#TopOfPage, pp. 1-8.
2.6 Gas cleaning and cooling, http://www.fao.org/docrep/t0512e0d.htm#TopOFPage, pp. 1-3.
Moulton, Lyle K. "Bottom Ash and Boiler Slag", *Proceedings of the Third International Ash Utilization Symposium*, U.S. Bureau of Mines, Information Circular No. 8640, Washington, DC, 1973.
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From a Thermally Ballasted Gasifier," Aug. 2005.
Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.
Coal Conversion Processes (Gasification), Encyclopedia of Chemical Technology, $4^{th}$ Edition, vol. 6, pp. 541-566.
Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.
Nahas, N.C., "Exxon Catalytic Coal Gasification Process—Fundamentals to Flowsheets," Fuel, vol. 62, No. 2, 1983, pp. 239-241.

(56) References Cited

OTHER PUBLICATIONS

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

"Integrate Gasification Combined Cycle (IGCC)," WorleyParsons Resources & Energy, http://www.worleyparsons.com/v5/page.aspx?id=164.

A.G. Collot et al., "Co-pyrolysis and co-gasification of coal and biomass in bench-scale fixed-bed and fluidized bed reactors", (1999) Fuel 78, pp. 667-679.

Wenkui Zhu et al., "Catalytic gasification of char from co-pyrolysis of coal and biomass", (2008) Fuel Processing Technology, vol. 89, pp. 890-896.

Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.

Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.

Brown et al., "Biomass-Derived Hydrogen From a thermally Ballasted Gasifier", Final Technical Report, Iowa State University, Aug. 2005.

Chiaramonte et al, "Upgrade Coke by Gasification", (1982) Hydrocarbon Processing, vol. 61 (9), pp. 255-257 (Abstract only).

* cited by examiner

PROCESSES FOR THE SEPARATION OF METHANE FROM A GAS STREAM

CROSS-REFERENCE TO RELATED APPLICATIONS

This application claims priority under 35 U.S.C. §119 from U.S. Provisional Application Ser. No. 61/041,307 (filed Apr. 1, 2008), the disclosure of which is incorporated by reference herein for all purposes as if fully set forth.

FIELD OF THE INVENTION

The present invention relates to processes for catalytically converting a carbonaceous feedstock into a plurality of gaseous products contained in a gas stream, and for separating methane from the gas stream. In particular, the invention relates to continuous processes for catalytically converting a carbonaceous feedstock into a plurality of gaseous products contained in a gas stream, and for separating methane from carbon monoxide and hydrogen in a manner that permits the recycling of hydrogen and carbon monoxide use in the catalytic gasification processes.

BACKGROUND OF THE INVENTION

In view of numerous factors such as higher energy prices and environmental concerns, the production of value-added gaseous products from lower-fuel-value carbonaceous feedstocks, such as biomass, coal and petroleum coke, is receiving renewed attention. The catalytic gasification of such materials to produce methane and other value-added gases is disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1, US2006/0265953A1, US2007/000177A1, US2007/083072A1, US2007/0277437A1 and GB1599932.

Reaction of lower-fuel-value carbonaceous feedstocks under conditions described in the above references typically yields a crude product gas and a char. The crude product gas typically comprises an amount of particles, which are removed from the gas stream to produce a gas effluent. This gas effluent typically contains a mixture of gases, including, but not limited to, methane, carbon dioxide, hydrogen, carbon monoxide, hydrogen sulfide, ammonia, unreacted steam, entrained fines, and other contaminants such as COS. Through processes known in the art, the gas effluent can be treated to remove carbon dioxide, hydrogen sulfide, steam, entrained fines, COS, and other contaminants, yielding a cleaned gas stream comprising methane, carbon monoxide, and hydrogen. Carbon monoxide may optionally be removed or converted at some point prior to hydrogen separation, yielding a cleaned gas stream comprising methane and hydrogen.

For some applications, it may be desirable to recover a gas stream that is enriched in methane. In some situations, it may even be desirable to recover a gas stream that almost entirely comprises methane. In such situations, the cleaned gas stream must undergo additional processing to remove substantially all of the hydrogen and, if present, carbon monoxide. On the other hand, hydrogen and mixtures of hydrogen and carbon monoxide ("syngas") have utility as an energy or raw material source.

In some situations, such as in the context of the present invention, it may be desirable to collect hydrogen and, optionally, carbon monoxide and recycle them as a raw material or energy source for a subsequent catalytic gasification process. Thus, there is a continued need for processes which permit the efficient recovery of methane, and also permit recovery of separate gas streams of carbon monoxide and hydrogen.

SUMMARY OF THE INVENTION

In a first aspect, the present invention provides a process for converting a carbonaceous feedstock into a plurality of gaseous products contained in a gas stream, and for separating hydrogen and methane from the gas stream, the process comprising the steps of: (a) supplying a carbonaceous feedstock to a gasification reactor; (b) reacting the carbonaceous feedstock in the gasification reactor in the presence of steam and a gasification catalyst and under suitable temperature and pressure to form a first gas stream comprising methane, hydrogen, carbon monoxide, carbon dioxide, and one or more additional gaseous by-products; (c) removing a substantial portion of the carbon dioxide and a substantial portion of the one or more additional gaseous by-products from the first gas stream to produce a second gas stream comprising methane, hydrogen, and optionally carbon monoxide; (d) at least partially separating hydrogen from the second gas stream to form a hydrogen-enriched gas stream and a hydrogen-depleted gas stream, wherein the hydrogen-depleted gas stream comprises methane, optionally carbon monoxide and up to about 4 mol % hydrogen; wherein, if the heating value of the hydrogen-depleted gas stream is less than 950 btu/scf (dry basis), and if the hydrogen-depleted gas stream comprises 1000 ppm or more of carbon monoxide: (1) at least partially separating carbon monoxide from the hydrogen-depleted gas stream to form (i) a carbon monoxide-enriched gas stream and (ii) a methane enriched gas stream having a heating value of at least 950 btu/scf (dry basis); or (2) at least partially methanating the carbon monoxide in the hydrogen-depleted gas stream to form a methane-enriched gas stream.

In a second aspect, the present invention provides a process for converting a carbonaceous feedstock into a plurality of gaseous products contained in a gas stream, and for separating hydrogen and methane from the gas stream, the process comprising the steps of: (a) supplying a first carbonaceous feedstock to a reactor; (b) at least partially combusting the first carbonaceous feedstock in the reactor in the presence of oxygen and under suitable temperature and pressure so as to generate (i) heat energy and (ii) a combustion gas stream comprising hydrogen, carbon monoxide, and carbon dioxide; (c) using the heat energy from the combustion of the first carbonaceous feedstock to generate steam; (d) introducing at least a portion of the steam, at least a portion of the combustion gas stream, a second carbonaceous feedstock and a gasification catalyst to a gasification reactor; (e) reacting the second carbonaceous feedstock in the gasification reactor in the presence of steam and the gasification catalyst under suitable temperature and pressure to form a first gas stream comprising methane, hydrogen, carbon monoxide, carbon dioxide and one or more additional gaseous by-products; (f) removing a substantial portion of the carbon dioxide and a substantial portion of the one or more gaseous by-products from the first gas stream to produce a second gas stream comprising methane, hydrogen and optionally carbon monoxide; (g) at least partially separating hydrogen from the second gas stream to form a hydrogen-enriched gas stream and a hydrogen-depleted gas stream, wherein the hydrogen-depleted gas stream comprises methane, optionally carbon monoxide and up to about 4 mol % hydrogen; wherein, if the heating value of the hydrogen-depleted gas stream is less than 950 btu/scf (dry basis), and if the hydrogen-depleted gas stream comprises 1000 ppm or more of carbon monoxide: (1) at least partially separating carbon monoxide from the hydrogen-depleted gas stream to form (i) a carbon monoxide-enriched gas stream and (ii) a methane enriched gas stream having a heating value of at least 950 btu/scf (dry basis); or (2) at least partially methanating the carbon monoxide in the hydrogen-depleted gas stream to form a methane-enriched gas stream.

DETAILED DESCRIPTION

The present invention relates to processes for converting a carbonaceous feedstock into a plurality of gaseous products contained in a gas stream, and for separating methane from the other gaseous products in the gas stream. The present invention provides processes for separating methane in a manner that allows for the recovery of a hydrogen gas stream and, optionally, a separate gas stream of carbon monoxide. Although the processes of the invention can be employed in a variety of gasification processes, the processes are particularly useful in situations where it is desirable to recover a substantially pure stream of methane gas and a substantially pure stream of hydrogen gas. In this way, the hydrogen can be used as an energy source or raw material, or can be mixed with controlled quantities of carbon monoxide to generate a syngas tailored to the desired application. Particularly, the invention provides a continuous catalytic gasification process that yields pipeline-grade methane and also recovers hydrogen, and optionally carbon monoxide, for recycle in the catalytic gasification process.

The present invention can be practiced, for example, using any of the developments to catalytic gasification technology disclosed in commonly owned US2007/0000177A1, US2007/0083072A1, US2007/0277437A1 and US2009/0048476A1; and U.S. patent application Ser. No. 12/234,012 (filed 19 Sep. 2008) and Ser. No. 12/234,018 (filed 19 Sep. 2008).

Moreover, the present invention can be practiced in conjunction with the subject matter of the following US Patent Applications, each of which was filed on Dec. 28, 2008: Ser. No. 12/342,554, entitled "CATALYTIC GASIFICATION PROCESS WITH RECOVERY OF ALKALI METAL FROM CHAR"; Ser. No. 12/342,565, entitled "PETROLEUM COKE COMPOSITIONS FOR CATALYTIC GASIFICATION"; Ser. No. 12/342,578, entitled "COAL COMPOSITIONS FOR CATALYTIC GASIFICATION"; Ser. No. 12/342,596, entitled "PROCESSES FOR MAKING SYNTHESIS GAS AND SYNGAS-DERIVED PRODUCTS"; Ser. No. 12/342,608, entitled "PETROLEUM COKE COMPOSITIONS FOR CATALYTIC GASIFICATION"; Ser. No. 12/342,628, entitled "PROCESSES FOR MAKING SYNGAS-DERIVED PRODUCTS"; Ser. No. 12/342,663, entitled "CARBONACEOUS FUELS AND PROCESSES FOR MAKING AND USING THEM"; Ser. No. 12/342,715, entitled "CATALYTIC GASIFICATION PROCESS WITH RECOVERY OF ALKALI METAL FROM CHAR"; Ser. No. 12/342,736, entitled "CATALYTIC GASIFICATION PROCESS WITH RECOVERY OF ALKALI METAL FROM CHAR"; Ser. No. 12/343,143, entitled "CATALYTIC GASIFICATION PROCESS WITH RECOVERY OF ALKALI METAL FROM CHAR"; Ser. No. 12/343,149, entitled "STEAM GENERATING SLURRY GASIFIER FOR THE CATALYTIC GASIFICATION OF A CARBONACEOUS FEEDSTOCK"; and Ser. No. 12/343,159, entitled "CONTINUOUS PROCESSES FOR CONVERTING CARBONACEOUS FEEDSTOCK INTO GASEOUS PRODUCTS".

Further, the present invention can be practiced in conjunction with the subject matter of the following US Patent Applications, each of which was filed Feb. 27, 2008: Ser. No. 12/395,293, entitled "PROCESSES FOR MAKING ABSORBENTS AND PROCESSES FOR REMOVING CONTAMINANTS FROM FLUIDS USING THEM"; Ser. No. 12/395,309, entitled "STEAM GENERATION PROCESSES UTILIZING BIOMASS FEEDSTOCKS"; Ser. No. 12/395,320, entitled "REDUCED CARBON FOOTPRINT STEAM GENERATION PROCESSES"; Ser. No. 12/395,330, entitled "PROCESS AND APPARATUS FOR THE SEPARATION OF METHANE FROM A GAS STREAM"; Ser. No. 12/395,344, entitled "SELECTIVE REMOVAL AND RECOVERY OF ACID GASES FROM GASIFICATION PRODUCTS"; Ser. No. 12/395,348, entitled "COAL COMPOSITIONS FOR CATALYTIC GASIFICATION"; Ser. No. 12/395,353, entitled "COAL COMPOSITIONS FOR CATALYTIC GASIFICATION"; Ser. No. 12/395,372, entitled "CO-FEED OF BIOMASS AS SOURCE OF MAKEUP CATALYSTS FOR CATALYTIC COAL GASIFICATION"; Ser. No. 12/395,381, entitled "COMPACTOR-FEEDER"; Ser. No. 12/395,385, entitled "CARBONACEOUS FINES RECYCLE"; Ser. No. 12/395,429, entitled "BIOMASS CHAR COMPOSITIONS FOR CATALYTIC GASIFICATION"; Ser. No. 12/395,433, entitled "CATALYTIC GASIFICATION PARTICULATE COMPOSITIONS"; and Ser. No. 12/395,447, entitled "BIOMASS COMPOSITIONS FOR CATALYTIC GASIFICATION".

The present invention can also be practiced in conjunction with the subject matter of U.S. patent application Ser. No. 12/415,050, filed concurrently herewith, entitled "SOUR SHIFT PROCESS FOR THE REMOVAL OF CARBON MONOXIDE FROM A GAS STREAM").

All publications, patent applications, patents and other references mentioned herein, including but not limited to those referenced above, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present invention be limited to the specific values recited when defining a range.

When the term "about" is used in describing a value or an end-point of a range, the invention should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting.

Gasification Methods

The gas recovery methods of the present invention are particularly useful in integrated gasification processes for converting carbonaceous feedstocks, such as petroleum coke, liquid petroleum residue, asphaltenes, biomass and/or coal to combustible gases, such as methane.

The gasification reactors for such processes are typically operated at moderately high pressures and temperature, requiring introduction of a carbonaceous material (i.e., a feedstock) to the reaction zone of the gasification reactor while maintaining the required temperature, pressure, and flow rate of the feedstock. Those skilled in the art are familiar with feed systems for providing feedstocks to high pressure and/or temperature environments, including, star feeders, screw feeders, rotary pistons, and lock-hoppers. It should be understood that the feed system can include two or more pressure-balanced elements, such as lock hoppers, which would be used alternately.

The catalyzed feedstock is provided to the catalytic gasifier from a feedstock preparation operation, and generally comprises a particulate composition of a crushed carbonaceous material and a gasification catalyst, as discussed below. In some instances, the catalyzed feedstock can be prepared at pressures conditions above the operating pressure of catalytic gasifier. Hence, the catalyzed feedstock can be directly passed into the catalytic gasifier without further pressurization.

Any of several catalytic gasifiers can be utilized. Suitable gasifiers include counter-current fixed bed, co-current fixed bed, fluidized bed, entrained flow, and moving bed reactors. A catalytic gasifier for gasifying liquid feeds, such as liquid petroleum residues, is disclosed in previously incorporated U.S. Pat. No. 6,955,695.

The pressure in the catalytic gasifier typically can be from about 10 to about 100 atm (from about 150 to about 1500 psig). The gasification reactor temperature can be maintained around at least about 450° C., or at least about 600° C., or at least about 900° C., or at least about 750° C., or about 600° C. to about 700° C.; and at pressures of at least about 50 psig, or at least about 200 psig, or at least about 400 psig, to about 1000 psig, or to about 700 psig, or to about 600 psig.

The gas utilized in the catalytic gasifier for pressurization and reactions of the particulate composition comprises steam, and optionally, oxygen or air, and is supplied, as necessary, to the reactor according to methods known to those skilled in the art.

For example, steam can be supplied to the catalytic gasifier from any of the steam boilers known to those skilled in the art can supply steam to the reactor. Such boilers can be powered, for example, through the use of any carbonaceous material such as powdered coal, biomass etc., and including but not limited to rejected carbonaceous materials from the particulate composition preparation operation (e.g., fines, supra). Steam can also be supplied from a second gasification reactor coupled to a combustion turbine where the exhaust from the reactor is thermally exchanged to a water source and produce steam. Alternatively, the steam may be provided to the gasification reactor as described previously incorporated U.S. patent application Ser. Nos. 12/343,149, 12/395,309 and 12/395,320.

Recycled steam from other process operations can also be used for supplementing steam to the catalytic gasifier. For example in the preparation of the catalyzed feedstock, when slurried particulate composition are dried with a fluid bed slurry drier, as discussed below, then the steam generated can be fed to the catalytic gasification reactor.

The small amount of heat input that may be required for the catalytic gasifier can be provided by superheating a gas mixture of steam and recycle gas feeding the gasification reactor by any method known to one skilled in the art. In one method, compressed recycle gas of CO and $H_2$ can be mixed with steam and the resulting steam/recycle gas mixture can be further superheated by heat exchange with the catalytic gasifier effluent followed by superheating in a recycle gas furnace.

A methane reformer can be optionally included in the process to supplement the recycle CO and $H_2$ stream and the exhaust from the slurry gasifier to ensure that enough recycle gas is supplied to the reactor so that the net heat of reaction is as close to neutral as possible (only slightly exothermic or endothermic), in other words, that the catalytic gasifier is run under substantially thermally neutral conditions. In such instances, methane can be supplied for the reformer from the methane product, as described below.

Reaction of the catalyzed feedstock in the catalytic gasifier, under the described conditions, provides a crude product gas and a char from the catalytic gasification reactor.

The char produced in the catalytic gasifier processes is typically removed from the catalytic gasifier for sampling, purging, and/or catalyst recovery in a continuous or batchwise manner. Methods for removing char are well known to those skilled in the art. One such method taught by EP-A-0102828, for example, can be employed. The char can be periodically withdrawn from the catalytic gasification reactor through a lock hopper system, although other methods are known to those skilled in the art.

Often, the char from the catalytic gasifier is directed to a catalyst recovery and recycle process. Processes have been developed to recover alkali metal from the solid purge in order to reduce raw material costs and to minimize environmental impact of a catalytic gasification process. For example, the char can be quenched with recycle gas and water and directed to a catalyst recycling operation for extraction and reuse of the alkali metal catalyst. Particularly useful recovery and recycling processes are described in U.S. Pat. No. 4,459,138, as well as previously incorporated U.S. Pat. No. 4,057,512 and US2007/0277437A1, and previously incorporated U.S. patent application Ser. Nos. 12/342,554, 12/342,715, 12/342,736 and 12/343,143. Reference can be had to those documents for further process details.

Upon completion of catalyst recovery, both the char, substantially free of the gasification catalysts and the recovered catalyst (as a solution or solid) can be directed to the feedstock preparation operation comprising a catalyzed feedstock preparation process and a slurry feedstock preparation process.

Carbonaceous Feedstock

The term "carbonaceous feedstock" as used herein includes a carbon source, typically coal, petroleum coke, asphaltene and/or liquid petroleum residue, but may broadly include any source of carbon suitable for gasification, including biomass.

The term "petroleum coke" as used herein includes both (i) the solid thermal decomposition product of high-boiling hydrocarbon fractions obtained in petroleum processing (heavy residues—"resid petcoke") and (ii) the solid thermal decomposition product of processing tar sands (bituminous sands or oil sands—"tar sands petcoke"). Such carbonization products include, for example, green, calcined, needle and fluidized bed petroleum coke.

Resid petcoke can be derived from a crude oil, for example, by coking processes used for upgrading heavy-gravity residual crude oil, which petroleum coke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as compounds of silicon and/or aluminum.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % percent inorganic compounds, based on the weight of the petroleum coke.

The term "asphaltene" as used herein is an aromatic carbonaceous solid at room temperature, and can be derived, from example, from the processing of crude oil and crude oil tar sands.

The term "liquid petroleum residue" as used herein includes both (i) the liquid thermal decomposition product of high-boiling hydrocarbon fractions obtained in petroleum processing (heavy residues—"resid liquid petroleum residue") and (ii) the liquid thermal decomposition product of processing tar sands (bituminous sands or oil sands—"tar sands liquid petroleum residue"). The liquid petroleum residue is substantially non-solid at room temperature; for example, it can take the form of a thick fluid or a sludge.

Resid liquid petroleum residue can also be derived from a crude oil, for example, by processes used for upgrading heavy-gravity crude oil distillation residue. Such liquid petroleum residue contains ash as a minor component, typically about 1.0 wt % or less, and more typically about 0.5 wt % of less, based on the weight of the residue. Typically, the ash in such lower-ash residues predominantly comprises metals such as nickel and vanadium.

Tar sands liquid petroleum residue can be derived from an oil sand, for example, by processes used for upgrading oil sand. Tar sands liquid petroleum residue contains ash as a minor component, typically in the range of about 2 wt % to about 12 wt %, and more typically in the range of about 4 wt % to about 12 wt %, based on the overall weight of the residue. Typically, the ash in such higher-ash residues predominantly comprises materials such as compounds of silicon and/or aluminum.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on total coal weight. Examples of useful coals include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, e.g., *Coal Data: A Reference*, Energy Information Administration, Office of Coal, Nuclear, Electric and Alternate Fuels, U.S. Department of Energy, DOE/EIA-0064(93), February 1995.

The term "ash" as used herein includes inorganic compounds that occur within the carbon source. The ash typically includes compounds of silicon, aluminum, calcium, iron, vanadium, sulfur, and the like. Such compounds include inorganic oxides, such as silica, alumina, ferric oxide, etc., but may also include a variety of minerals containing one or more of silicon, aluminum, calcium, iron, and vanadium. The term "ash" may be used to refer to such compounds present in the carbon source prior to gasification, and may also be used to refer to such compounds present in the char after gasification.

Catalyst-Loaded Carbonaceous Feedstock

The carbonaceous composition is generally loaded with an amount of an alkali metal compound to promote the steam gasification to methane. Typically, the quantity of the alkali metal compound in the composition is sufficient to provide a ratio of alkali metal atoms to carbon atoms ranging from about 0.01, or from about 0.02, or from about 0.03, or from about 0.04, to about 0.06, to about 0.07, or to about 0.08, or to about 0.1. Further, the alkali metal is typically loaded onto a carbon source to achieve an alkali metal content of from about 3 to about 10 times more than the combined ash content of the carbonaceous material (e.g., coal and/or petroleum coke), on a mass basis.

Alkali metal compounds suitable for use as a gasification catalyst include compounds selected from the group consisting of alkali metal carbonates, bicarbonates, formates, oxalates, amides, hydroxides, acetates, halides, nitrates, sulfides, and polysulfides. For example, the catalyst can comprise one or more of $Na_2CO_3$, $K_2CO_3$, $Rb_2CO_3$, $Li_2CO_3$, $Cs_2CO_3$, NaOH, KOH, RbOH, or CsOH, and particularly, potassium carbonate and/or potassium hydroxide.

Any methods known to those skilled in the art can be used to associate one or more gasification catalysts with the carbonaceous composition. Such methods include, but are not limited to, admixing with a solid catalyst source and impregnating the catalyst onto the carbonaceous solid. Several impregnation methods known to those skilled in the art can be employed to incorporate the gasification catalysts. These methods include, but are not limited to, incipient wetness impregnation, evaporative impregnation, vacuum impregnation, dip impregnation, and combinations of these methods. Gasification catalysts can be impregnated into the carbonaceous solids by slurrying with a solution (e.g., aqueous) of the catalyst.

That portion of the particulate carbonaceous feedstock of a particle size suitable for use in the gasifying reactor can then be further processed, for example, to impregnate one or more catalysts and/or co-catalysts by methods known in the art, for example, as disclosed in previously incorporated U.S. Pat. No. 4,069,304, U.S. Pat. No. 4,092,125, U.S. Pat. No. 4,468,231, U.S. Pat. No. 4,551,155 and U.S. Pat. No. 5,435,940; and previously incorporated U.S. patent application Ser. Nos. 12/234,012, 12/234,018, 12/342,565, 12/342,578, 12/342,608, 12/343,159, 12/342,578 and 12/342,596.

One particular method suitable for combining the coal particulate with a gasification catalyst to provide a catalyzed carbonaceous feedstock where the catalyst has been associated with the coal particulate via ion exchange is described in previously incorporated US2009/0048476A1. The catalyst loading by ion exchange mechanism is maximized (based on adsorption isotherms specifically developed for the coal), and the additional catalyst retained on wet including those inside the pores is controlled so that the total catalyst target value is obtained in a controlled manner. Such loading provides a catalyzed coal particulate as a wet cake. The catalyst loaded and dewatered wet coal cake typically contains, for example, about 50% moisture. The total amount of catalyst loaded is controlled by controlling the concentration of catalyst components in the solution, as well as the contact time, temperature and method, as can be readily determined by those of ordinary skill in the relevant art based on the characteristics of the starting coal.

In embodiments of the invention, the entirety of the carbonaceous feedstock need not be loaded with a gasification catalyst. In some embodiments, only a portion of the carbonaceous feedstock is loaded with a gasification catalyst. In such embodiments, the carbonaceous feedstock (part loaded and part unloaded) may optionally be dry mixed with gasification catalyst. In other embodiments, however, substantially all of the carbonaceous feedstock is loaded with gasification catalyst. In these embodiments, though, the loaded carbonaceous feedstock may optionally be dry mixed with an amount of gasification catalyst.

The catalyzed feedstock can be stored for future use or transferred to a feed operation for introduction into the gasification reactor. The catalyzed feedstock can be conveyed to storage or feed operations according to any methods known to those skilled in the art, for example, a screw conveyer or pneumatic transport.

Steam Generation

The steam supplied to the gasification reactor can originate from a variety of sources, including commercial gasification reactors, oxy-fuel combustors, and boilers. The gasification or combustion reaction of a carbonaceous feedstock generates large amounts of heat energy. Advantageously, this heat energy can be used to contact any type of heat exchanger which is also in contact with a water source, thereby generating steam. For example, any of the boilers known to those skilled in the art can supply steam to the reactor. While any water source can be used to generate steam, the water commonly used in known boiler systems is purified and deionized (about 0.3-1.0 microsiemens/cm) so that corrosive processes are slowed. Such boilers can be powered, for example, through the combustion of any carbonaceous material, including pulverized/powdered coal, biomass, and rejected carbonaceous materials from the feedstock preparation operation (e.g., fines, supra). The thermal energy from the burning the carbonaceous material heats the water in the boiler, which eventually converts into steam (at about 700° F. and 3,200 psi). The steam is routed from the boiler into heated tubes, which are typically located in the furnace at or near the exit conduit carrying the combustion gases. The steam can be routed via heated conduits to the gasification reactor, it can be used to dry a carbonaceous feedstock, or it can be prepared and routed to a steam turbine for generation of electricity. In order to avoid excessive cooling of the steam during transport, the heated conduits for carrying steam can also be superheated (e.g., via contact with a heat exchanger) prior to delivery of the steam to its endpoint. Suitable methods of steam generation are described in previously incorporated U.S. patent application Ser. Nos. 12/395,309 and 12/395,320.

Steam can also be supplied from a second gasification reactor coupled with a combustion turbine, the exhaust of which contacts a heat exchanger in contact with a water source, which can include a boiler system as described above, to produce steam.

Recycled steam from other process operations can also be used for supplying steam to the reactor. For example, when a slurried carbonaceous feedstock is dried with a fluid bed slurry drier, as discussed herein, the steam generated through vaporization can be fed to the gasification reactor. Similarly, steam can be generated directly from a slurry gasifier which produces steam and synthesis gas from an aqueous carbonaceous feed slurry, such as described in previously incorporated U.S. patent application Ser. No. 12/343,149. At least a portion of the steam can also be used to drive a steam turbine that generates electricity.

Treatment of Crude Product Gas

Crude product gas effluent leaving the catalytic gasifier can pass through a portion of the reactor which serves as a disengagement zone where particles too heavy to be entrained by the gas leaving the reactor (i.e., fines) are returned to the fluidized bed. The disengagement zone can include one or more internal cyclone separators or similar devices for removing fines and particulates from the gas. The gas effluent passing through the disengagement zone and leaving the catalytic gasifier generally contains $CH_4$, $CO_2$, $H_2$ and $CO$, $H_2S$, $NH_3$, unreacted steam, entrained fines, and other contaminants such as COS.

The gas stream from which the fines have been removed can then be passed through a heat exchanger to cool the gas and the recovered heat can be used to preheat recycle gas and generate high pressure steam. Residual entrained fines can also be removed by any suitable means such as external cyclone separators, optionally followed by Venturi scrubbers. The recovered fines can be processed to recover alkali metal catalyst then passed to the slurry feedstock preparation process or returned to the catalytic gasification reactor, or directly recycled back to feedstock preparation as described in previously incorporated U.S. patent application Ser. No. 12/395,385.

The gas stream from which the fines have been removed is fed to a gas purification operation optionally comprising COS hydrolysis reactors for COS removal (sour process) and further cooled in a heat exchanger to recover residual heat.

Methods for COS hydrolysis are known to those skilled in the art, for example, see U.S. Pat. No. 4,100,256.

Following COS removal, the gas stream generally contains $CH_4$, $CO_2$, $H_2$, CO, $H_2S$, $NH_3$, and steam. This gas stream can be further treated in a water scrubber for recovery of ammonia, yielding a scrubbed gas that comprises at least $H_2S$, $CO_2$, CO, $H_2$, and $CH_4$.

Scrubber water and sour process condensate can be processed to strip and recover $H_2S$, $CO_2$ and $NH_3$; such processes are well known to those skilled in the art. $NH_3$ can typically be recovered as an aqueous solution (e.g., 20 wt %).

Carbon monoxide can be removed from a gas stream at any stage of the process by incorporating a sour gas shift reaction. Sour gas shift involves reacting steam and CO at suitable conditions to yield $CO_2$ and $H_2$. This sour shift process is described in detail, for example, in U.S. Pat. No. 7,074,373. Its use within a catalytic gasification process is described in previously incorporated U.S. patent application Ser. No. 12/415,050, entitled "SOUR SHIFT PROCESS FOR THE REMOVAL OF CARBON MONOXIDE FROM A GAS STREAM"). The process typically involves adding water, or using water contained in the gas, and reacting the resulting water-gas mixture adiabatically over a steam reforming catalyst. Typical steam reforming catalysts include one or more Group VIII metals on a heat-resistant support. The sour gas shift can, for example, remove at least about 80%, or at least about 90%, or at least about 95%, or at least about 99%, of the CO in the treated gas stream.

Methods and reactors for performing the sour gas shift reaction on a CO-containing gas stream are, in a general sense, well known to those of skill in the art. Suitable reaction conditions and suitable reactors can vary depending on the amount of CO that must be depleted from the gas stream. In some embodiments, the sour gas shift can be performed in a single stage within a temperature range from about 100° C., or from about 150° C., or from about 200° C., to about 250° C., or to about 300° C., or to about 350° C. In these embodiments, the shift reaction can be catalyzed by any suitable catalyst known to those of skill in the art. Such catalysts include, but are not limited to, $Fe_2O_3$-based catalysts, such as $Fe_2O_3$—$Cr_2O_3$ catalysts, and other transition metal-based and transition metal oxide-based catalysts. In other embodiments, the sour gas shift can be performed in multiple stages. In one particular embodiment, the sour gas shift is performed in two stages. This two-stage process uses a high-temperature sequence followed by a low-temperature sequence. The gas temperature for the high-temperature shift reaction ranges from about 350° C. to about 1050° C. Typical high-temperature catalysts include, but are not limited to, iron oxide optionally combined with lesser amounts of chromium oxide. The gas temperature for the low-temperature shift ranges from about 150° C. to about 300° C., or from about 200° C. to about 250° C. Low-temperature shift catalysts include, but are not limited to, copper oxides that may be supported on zinc oxide or alumina.

Steam shifting is often carried out with heat exchangers and steam generators to permit the efficient use of heat energy. Shift reactors employing these features are well known to those of skill in the art. An example of a suitable shift reactor is illustrated in previously incorporated U.S. Pat. No. 7,074,373, although other designs known to those of skill in the art are also effective.

A subsequent acid gas removal process can be used to remove $H_2S$ and $CO_2$ from the scrubbed gas stream by a physical absorption method involving solvent treatment of the gas to give a cleaned gas stream. Such processes involve contacting the scrubbed gas with a solvent such as monoethanolamine, diethanolamine, methyldiethanolamine, diisopropylamine, diglycolamine, a solution of sodium salts of amino acids, methanol, hot potassium carbonate or the like. One method can involve the use of SELEXOL® (UOP LLC, Des Plaines, Ill. USA) or RECTISOL® (Lurgi AG, Frankfurt am Main, Germany) solvent having two trains; each train consisting of an $H_2S$ absorber and a $CO_2$ absorber. The spent solvent containing $H_2S$, $CO_2$ and other contaminants can be regenerated by any method known to those skilled in the art, including contacting the spent solvent with steam or other stripping gas to remove the contaminants or by passing the spent solvent through stripper columns. Recovered acid gases can be sent for sulfur recovery processing; for example, any recovered $H_2S$ from the acid gas removal and sour water stripping can be converted to elemental sulfur by any method known to those skilled in the art, including the Claus process. Sulfur can be recovered as a molten liquid. Stripped water can be directed for recycled use in preparation of the catalyzed feedstock. One method for removing acid gases from the scrubbed gas stream is described in previously incorporated U.S. patent application Ser. No. 12/395,344.

Advantageously, $CO_2$ generated in the process, whether in the steam generation or catalytic gasification or both (and in the optional sour gas shift), can be recovered for subsequent use or sequestration, enabling a greatly decreased carbon footprint (as compared to direct combustion of the feedstock) as a result. Processes for reducing a carbon footprint are described in previously incorporated U.S. patent application Ser. Nos. 12/395,309 and 12/395,320.

The resulting cleaned gas stream exiting the gas purification operation contains appreciable amounts of $CH_4$ and $H_2$ and, optionally, CO, and can also contain small amounts of $CO_2$ and $H_2O$.

In accordance with the present invention, this cleaned gas stream can be further processed to provide at least a partial separation of hydrogen from the other gaseous products in the gas stream. This results in the formation of a hydrogen-enriched gas stream and a hydrogen-depleted gas stream. The hydrogen-enriched gas stream comprises at least about 70 mol %, or at least about 80 mol %, or at least about 90 mol %, or at least about 97 mol %, hydrogen gas. In some embodiments, the hydrogen-enriched gas stream substantially comprises hydrogen gas, having, for example, at least about 90 mol % hydrogen gas. The hydrogen-depleted gas stream at least comprises methane. In some embodiments, the hydrogen-depleted gas stream at least comprises methane and carbon monoxide, and can also comprise up to about 4 mol % hydrogen.

Various methods for effecting separation of hydrogen are known to those of skill in the art. Such methods include cryogenic separation and membrane-based separation. For embodiments where the cleaned gas stream comprises no appreciable amounts of carbon monoxide (e.g., less than about 1000 ppm CO), the separation can be effected through methods involving the formation of methane hydrates, as illustrated in previously incorporated U.S. patent application Ser. No. 12/395,330.

The hydrogen-depleted gas stream at least comprises methane. In some embodiments, the hydrogen-depleted gas stream should have a heating value of at least 950 btu/scf (dry basis). For example, in some embodiments, the hydrogen-depleted gas stream comprises at least about 80 mol %, or at least about 90 mol %, or at least about 95 mol % methane. In some embodiments, however, the hydrogen-depleted gas stream at least comprises both methane and carbon monoxide, and optionally a minor amount of hydrogen (generally about 4 mol % or less). In some such embodiments, the hydrogen-depleted gas comprises at least about 1000 ppm carbon monoxide. In other embodiments, the hydrogen depleted gas stream is substantially free of carbon monoxide, having, for example, less than about 1000 ppm carbon monoxide.

In embodiments where the hydrogen-depleted gas stream comprises 1000 ppm or more carbon monoxide, and where the heating value of the hydrogen-depleted gas stream is less than 950 btu/scf (dry basis), the methane in the hydrogen-depleted gas stream and the carbon monoxide in the hydrogen-depleted gas stream can be at least partially separated from each other. This partial separation of methane and carbon monoxide yields at least a methane-enriched gas stream and a carbon monoxide-enriched gas stream. The methane-enriched gas stream comprises at least about 80 mol %, or at least about 90 mol %, or at least about 95 mol % methane. Moreover, in typical embodiments, the methane-enriched gas stream has a heating value of at least about 950 btu/scf (dry basis). The carbon monoxide-enriched gas stream comprises at least about 50 mol %, or at least about 65 mol %, or at least about 80 mol %, or at least about 90 mol %, carbon monoxide.

In embodiments of the invention where the separation yields a methane-enriched gas stream that substantially comprises methane, the methane stream can be recovered and used as a high-quality energy source. For example, the methane can be compressed and introduced into the existing natural gas pipeline system. Or, a portion of the methane product can also be used as plant fuel for a gas turbine.

In some embodiments, a methane-enriched gas stream (e.g., the hydrogen-depleted gas stream), if it contains appreciable amounts of CO, can be further enriched in methane by performing trim methanation to reduce the CO content. One may carry out trim methanation using any suitable method and apparatus known to those of skill in the art, including, for example, the method and apparatus disclosed in U.S. Pat. No. 4,235,044.

In embodiments of the invention where the separation yields a hydrogen-enriched gas stream that substantially comprises hydrogen, the hydrogen stream can be recovered and used as an energy source and/or as a reactant. For example, the hydrogen can be used as an energy source for hydrogen-based fuel cells, or in a subsequent catalytic gasification process. In another example, hydrogen can be used as a fuel for a steam generation process, such as described in previously incorporated U.S. patent application Ser. Nos. 12/395,309 and 12/395,320; or as disclosed in previously incorporated U.S. patent application Ser. No. 12/415,050, entitled "SOUR SHIFT PROCESS FOR THE REMOVAL OF CARBON MONOXIDE FROM A GAS STREAM").

In embodiments of the invention where the separation yields a carbon monoxide-enriched gas stream that substantially comprises carbon monoxide, the carbon monoxide stream can be recovered and used as part of a fuel mixture (e.g., with hydrogen), or in a subsequent catalytic gasification process. The carbon monoxide gas stream can also be combined with hydrogen and used as fuel for a steam generation process, such as described in previously incorporated Ser. No. 12/395,309 and Ser. No. 12/395,320; or as disclosed in previously incorporated U.S. patent application Ser. No. 12/415,050, entitled "SOUR SHIFT PROCESS FOR THE REMOVAL OF CARBON MONOXIDE FROM A GAS STREAM").

In some embodiments of the invention, the hydrogen is recycled back to the catalytic gasifier, directly and/or via another unit operation such as discussed below.

Continuous Gasification Process Employing Methane Separation Options

The invention also provides for a continuous catalytic gasification process wherein hydrogen, and optionally, carbon monoxide, are recycled and used in the catalytic gasification processes.

1. Introduction of a Carbonaceous Feedstock to a Gasification Reactor

The processes of the invention require the supplying of a carbonaceous feedstock and a gas feed (comprising steam, carbon monoxide and hydrogen) to a gasification reactor.

Suitable gasification reactors and carbonaceous feedstocks are described above. In typical embodiments, the carbonaceous feedstock is provided in particulate form, although this need not be the case in all embodiments. In typical embodiments, the carbonaceous feedstock is loaded with, or at least mixed with, a suitable gasification catalyst. Suitable catalysts are described above. Typical processes at least include potassium carbonate and/or potassium hydroxide.

In some embodiments, steam may also be introduced into the gasification reactor in the same step as the introduction of the carbonaceous feedstock. The steam can be generated by any suitable method for the generation of steam known to those of skill in the art. Suitable methods of steam generation are described above.

In some embodiments, a stream of feed gases (in addition to the steam) can also be introduced into the gasification reactor within the same step as the introduction of the carbonaceous feedstock. This feed gas stream at least comprises hydrogen and carbon monoxide, but can also include carbon dioxide and water vapor. The feed gas stream can be generated in a variety of ways.

In some embodiments, the feed gas stream comprises the product of reforming methane in a methane reformer. In a particular embodiment, the input gases for the methane reformation are a portion of the methane product of catalytic gasification of a carbonaceous feedstock. The methane reacts in the methane reformer to generate a gas stream that at least comprises carbon monoxide and hydrogen gas. This gas stream comprising CO and $H_2$ can serve as a recycle gas stream (combined with the hydrogen-enriched gas stream) that is introduced (i.e., recycled) into the gasification reactor as the product gas stream.

In some embodiments, the feed gas stream is the product of a combustion reaction. In a particular embodiment, the combustion reaction occurs in a reactor (e.g., an oxy-blown gasifier or a combustion reactor). A carbonaceous feedstock is supplied to the reactor in the presence of oxygen. The carbonaceous feedstock may or may not be in particulate form, and can have the same or different composition that the carbonaceous feedstock used for the catalytic gasification. The combustion process typically yields a resulting gas stream that at least comprises CO, $H_2$ and $CO_2$, and $H_2O$ if the combustion process is used to generate steam. The combustion gas stream, in combination with the hydrogen enriched gas stream, can serve as a gas stream that is introduced into the gasification reactor as the feed gas stream.

In some embodiments, the feed gas stream comprises hydrogen, and optionally carbon monoxide, that are recovered from the cleaned gas stream of a previous catalytic gasification process. Suitable methods for separating and recovering hydrogen-enriched gas streams and carbon monoxide-enriched gas streams are described herein.

In embodiments where the feed gas stream is the product of a combustion reaction, the heat energy from the combustion reaction can be used as a heat source for the steam generation process, described above.

2. Catalytic Gasification of Carbonaceous Feedstock

A carbonaceous feedstock is reacted in a gasification reactor in the presence of the feed gas stream (including steam) and a gasification catalyst under suitable temperature and pressure to form a gas stream comprising methane, hydrogen, carbon monoxide, carbon dioxide, and one or more additional gaseous products. Catalytic gasification, including suitable reactors and reaction conditions, is described above.

3. Removal of $CO_2$ and Other Gaseous By-Products

Carbon dioxide and other gaseous by-products (e.g., hydrogen sulfide, ammonia, etc.) can be removed from the gas stream. Suitable methods for removal of these gases from the gas stream are described above. The separation results in at least two gas streams. One gas stream substantially comprises one or more of hydrogen, methane, and carbon monoxide. In typical embodiments, this gas stream comprises at least about 90 mol %, or at least about 95 mol %, or at least about 99 mol %, methane, hydrogen, and/or carbon monoxide. The relative proportions of these gases in the gas stream can vary depending on a variety of factors, including the gasification conditions and the nature of the carbonaceous feedstock. The other gas stream comprises carbon dioxide. In some embodiments, the gas stream comprising carbon dioxide can be recovered and sequestered to provide for carbon footprint reduction.

4. Separation of Hydrogen from Gas Stream

After removal of $CO_2$ and other gaseous by-products, the gas stream comprises hydrogen, methane and, optionally, carbon monoxide. Hydrogen is at least partially separated from the other gaseous products in the gas stream. This separation results in a hydrogen-enriched gas stream and a hydrogen-depleted gas stream. The hydrogen-enriched gas stream comprises at least about 70 mol %, or at least about 80 mol %, or at least about 90 mol %, or at least about 97 mol %, hydrogen gas. In some embodiments, the hydrogen-enriched gas stream substantially comprises hydrogen gas, having, for example, at least about 90 mol % hydrogen gas. The hydrogen-depleted gas stream at least comprises methane. In some embodiments, the hydrogen-depleted gas stream at least comprises methane and carbon monoxide, and can also comprise up to about 4 mol % hydrogen.

Suitable means of separating hydrogen from a gas stream are described above.

In some embodiments, the hydrogen-enriched gas stream can be recovered following separation. In such embodiments, the invention includes any suitable means of gas recovery known to those of skill in the art. The recovery method and apparatus can vary depending on factors such as the means used to effect separation and the desired use of the enriched gas stream following separation.

5. Separation of Methane and Carbon Monoxide

The hydrogen-depleted gas stream at least comprises methane. For example, in some embodiments, the hydrogen-depleted gas stream comprises at least about 80 mol %, or at least about 90 mol %, or at least about 95 mol % methane. In some embodiments, however, the hydrogen-depleted gas stream at least comprises both methane and carbon monoxide. In some such embodiments, the hydrogen-depleted gas comprises at least about 1000 ppm carbon monoxide. In other embodiments, the hydrogen depleted gas stream is substantially free of carbon monoxide, having, for example, less than about 1000 ppm carbon monoxide.

In embodiments where the hydrogen-depleted gas stream comprises 1000 ppm or more carbon monoxide and where the heating value of the hydrogen-depleted gas stream is less than 950 btu/scf (dry basis), the methane in the hydrogen-depleted gas stream and the carbon monoxide in the hydrogen-depleted gas stream can be at least partially separated from each other. This partial separation of methane and carbon monoxide yields at least a methane-enriched gas stream and a carbon monoxide-enriched gas stream. The methane-enriched gas stream comprises at least about 80 mol %, or at least about 90 mol %, or at least about 95 mol % methane. Moreover, in typical embodiments, the methane-enriched gas stream has a heating value of at least about 950 btu/scf (dry basis). The carbon monoxide-enriched gas stream comprises at least about 50 mol %, or at least about 65 mol %, or at least about 80 mol % carbon monoxide.

Suitable means of separating methane and carbon monoxide are described above.

In some embodiments, the methane-enriched gas stream and/or the carbon monoxide-enriched gas stream can be recovered following separation. In such embodiments, the invention includes any suitable means of gas recovery known to those of skill in the art. The recovery method and apparatus can vary depending on factors such as the means used to effect separation and the desired use of the enriched gas stream following separation. For example, in embodiments where the methane-enriched gas stream substantially comprises methane, the methane-enriched gas stream can be recovered by pressurizing the gas in a suitable pressurizing apparatus and introducing the pressurized methane into a network of natural gas pipelines.

Further process details can be had by reference to the previously incorporated patents and publications.

Pipeline Quality Natural Gas

The invention provides processes that, in certain embodiments, can generate pipeline-quality natural gas from the catalytic gasification of a carbonaceous feedstock. A "pipeline-quality natural gas" typically refers to a natural gas that is (1) within ±5% of the heating value of pure methane (whose heating value is 1010 btu/ft$^3$ under standard atmospheric conditions), and (2) free of water and toxic or corrosive contaminants. In some embodiments of the invention, the methane-enriched gas stream described in the above processes satisfies such requirements.

Pipeline-quality natural gas can contain gases other than methane, as long as the resulting gas mixture has a heating value that is within ±5% of 1010 btu/ft$^3$ and is neither toxic nor corrosive. Therefore, a methane-enriched gas stream can comprise gases whose heating value is less than that of methane and still qualify as a pipeline-quality natural gas, as long as the presence of the other gases does not lower the gas stream's heating value below 950 btu/scf (dry basis). Therefore, a methane-enriched gas stream can comprise up to about 4 mol % hydrogen and still serve as a pipeline-quality natural gas. Carbon monoxide has a higher heating value than hydrogen. Thus, pipeline-quality natural gas could contain even higher percentages of CO without degrading the heating value of the gas stream. A methane-enriched gas stream that is suitable for use as pipeline-quality natural gas preferably has less than about 1000 ppm CO.

EXAMPLES

The following example illustrates one or more particular embodiments of the invention. The example provides merely one or more embodiments of the claimed invention, and is not intended to be limiting in any manner.

Example 1

Continuous Process Employing Methane Separation Options

Figure 1:
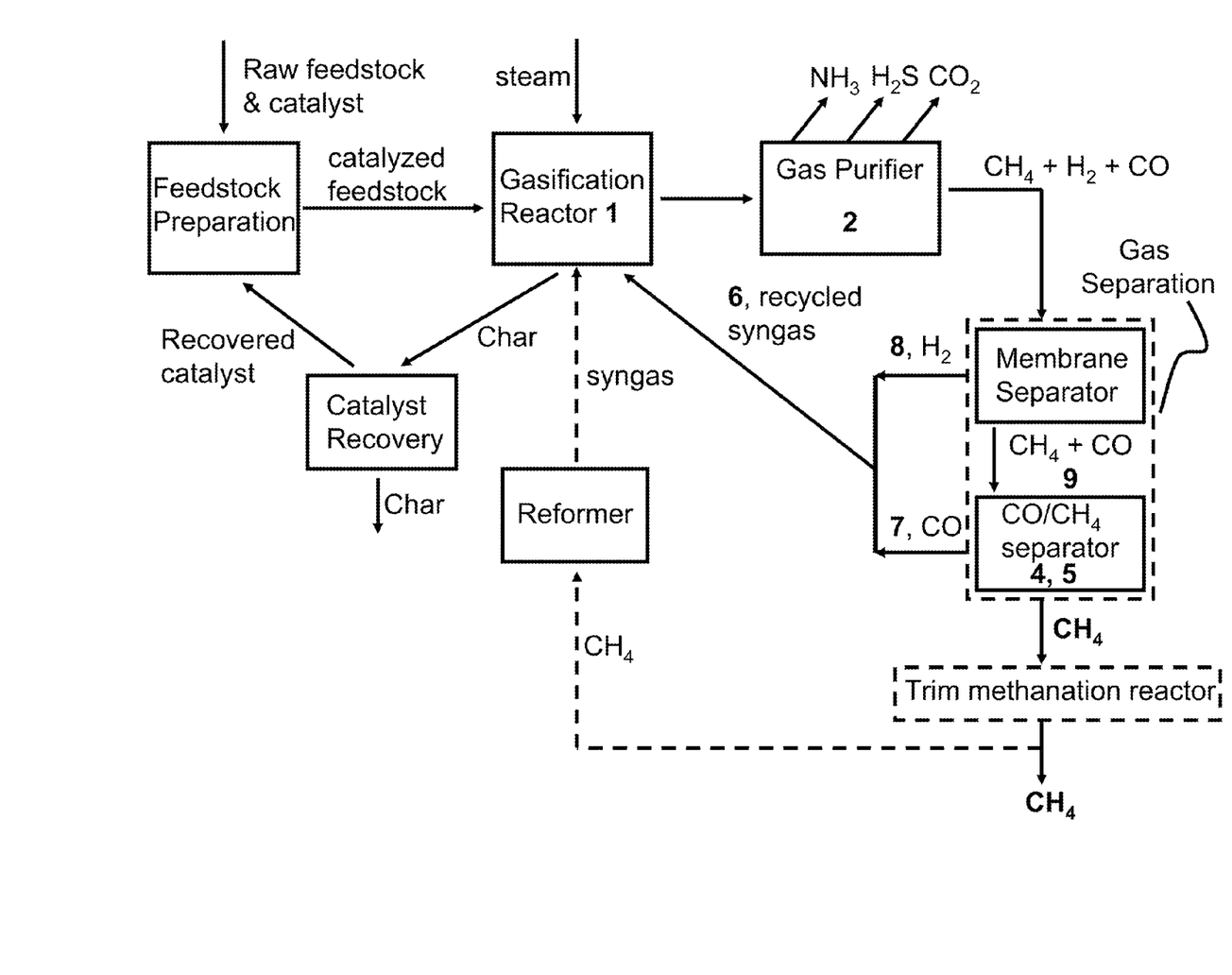
FIG. 1 depicts a block diagram that illustrates a continuous process for gasification of a carbonaceous feedstock, where the process includes separation of methane from hydrogen and, optionally, carbon monoxide, and the recycle of hydrogen and carbon monoxide for use in the catalytic gasification process.

FIG. 1 illustrates several embodiments of a continuous process encompassed by the present invention. A quantity of feedstock can be prepared by wet grinding it into a fine particulate using a wet grinder. After grinding, the feedstock should have a particle size ranging from about 45 µm to about 2500 µm. The feedstock can be removed from the grinder and introduced to a catalyst loading unit (e.g., one or more slurry tanks), where gasification catalyst can be loaded onto the feedstock particulate. The loaded catalyst can comprise a mixture of catalyst recovered from a previous gasification process and raw make-up catalyst. After catalyst is loaded onto the feedstock particulate, the catalyst-loaded feedstock can be introduced into a gasification reactor (1).

The feedstock should be converted in the gasification reactor (1), in the presence of steam, to a plurality of gaseous products comprising at least $CH_4$, $CO_2$, $H_2$, CO, $H_2S$, $NH_3$, steam, and COS. The COS can be removed through a hydrolysis process carried out in a hydrolysis reactor (not shown). Then, ammonia can be removed by scrubbing the gas in a multi-unit scrubber apparatus (shown as part of a generic separation apparatus (2)). Then, $CO_2$ and $H_2S$ can be substantially removed from the gas stream in an acid gas removal process involving the exposure of the gas stream to a solvent in a solvent treatment vessel (shown as part of a generic separation apparatus (2)). At this point, the gas stream should substantially comprise methane, carbon monoxide, and hydrogen.

Optionally, a sour shift reactor can be utilized prior to the acid gas removal process to convert substantially all of the CO (in the presence of steam) to $CO_2$ and $H_2$. In this instance, the gas stream after the acid gas removal process should substantially comprise methane and hydrogen.

The hydrogen gas can be substantially separated from the methane and carbon monoxide by passing the gas stream through a membrane separator (3). Two gas streams (8, 9) emerge from the membrane separator. One gas stream should substantially comprise hydrogen (8). The other gas stream should substantially comprise methane and carbon monoxide (9).

The methane and carbon monoxide can be separated from each other by several available means. In a first option, the gas mixture can be introduced to a cryogenic separator (4), which effects separation of the gases into a gas stream that substantially comprises methane and another gas stream that substantially comprises carbon monoxide (7). In a second option, the gas mixture can be introduced to a methane hydrate separator (5), which effects separation of the gases into a gas stream that substantially comprises methane and another gas stream that substantially comprises carbon monoxide (7). In a third option, the gas mixture can be purified by introducing the gas mixture into a trim methanation reactor, such as described above. Each of these separation methods is described in greater detail above and in the provisional applications incorporated by reference.

The methane gas stream can be recovered and used for pipeline grade natural gas. The hydrogen gas stream (8) can be combined with the carbon monoxide gas stream (6) and recycled into the gasification reactor to be used in a subsequent catalytic gasification process.

We claim:

1. A process for converting a carbonaceous feedstock into a plurality of gaseous products contained in a gas stream, and for separating hydrogen and methane from the gas stream, the process comprising the steps of:
   (a) supplying a carbonaceous feedstock to a gasification reactor, wherein the carbonaceous feedstock includes a carbon source selected from the group consisting of coal, petroleum coke, asphaltene, liquid petroleum residue, biomass and mixtures thereof;
   (b) reacting the carbonaceous feedstock in the gasification reactor in the presence of steam and a gasification catalyst and under suitable temperature and pressure to form a first gas stream comprising methane, hydrogen, carbon monoxide, carbon dioxide, and one or more additional gaseous by-products;
   (c) removing a substantial portion of the carbon dioxide and a substantial portion of the one or more additional gaseous by-products from the first gas stream to produce a second gas stream comprising methane, hydrogen, and optionally carbon monoxide;
   (d) at least partially separating hydrogen from the second gas stream to form a hydrogen-enriched gas stream and a hydrogen-depleted gas stream, wherein the hydrogen-depleted gas stream comprises methane, optionally carbon monoxide and up to about 4 mol % hydrogen;
   wherein, if the heating value of the hydrogen-depleted gas stream is less than 950 btu/scf (dry basis), and if the hydrogen-depleted gas stream comprises 1000 ppm or more of carbon monoxide: (1) at least partially separating carbon monoxide from the hydrogen-depleted gas stream to form (i) a carbon monoxide-enriched gas stream and (ii) a methane-enriched gas stream having a heating value of at least 950 btu/scf (dry basis); or (2) at least partially methanating the carbon monoxide in the hydrogen-depleted gas stream to form a methane-enriched gas stream.

2. The process of claim 1, wherein the second gas stream comprises carbon monoxide, and the hydrogen-depleted gas stream comprises at least about 1000 ppm carbon monoxide.

3. The process of claim 2, wherein the carbon monoxide in the hydrogen-depleted gas stream is at least partially methanated to form a methane-enriched gas stream.

4. The process of claim 1, wherein the gasification catalyst is an alkali metal gasification catalyst.

5. The process of claim 4, wherein the alkali metal is potassium.

6. The process of claim 1, wherein the hydrogen is separated by passing the second gas stream through a hydrogen membrane separator.

7. A process for converting a carbonaceous feedstock into a plurality of gaseous products contained in a gas stream, and for separating hydrogen and methane from the gas stream, the process comprising the steps of:
   (a) supplying a first carbonaceous feedstock to a reactor;
   (b) at least partially combusting the first carbonaceous feedstock in the reactor in the presence of oxygen and under suitable temperature and pressure so as to generate (i) heat energy and (ii) a combustion gas stream comprising hydrogen, carbon monoxide, and carbon dioxide;
   (c) using the heat energy from the combustion of the first carbonaceous feedstock to generate steam;
   (d) introducing at least a portion of the steam, at least a portion of the combustion gas stream, a second carbonaceous feedstock and a gasification catalyst to a gasification reactor, wherein the second carbonaceous feedstock includes a carbon source selected from the group consisting of coal, petroleum coke, asphaltene, liquid petroleum residue, biomass and mixtures thereof;
   (e) reacting the second carbonaceous feedstock in the gasification reactor in the presence of steam and the gasification catalyst under suitable temperature and pressure to form a first gas stream comprising methane, hydrogen, carbon monoxide, carbon dioxide and one or more additional gaseous by-products;
   (f) removing a substantial portion of the carbon dioxide and a substantial portion of the one or more gaseous by-products from the first gas stream to produce a second gas stream comprising methane, hydrogen and optionally carbon monoxide;

(g) at least partially separating hydrogen from the second gas stream to form a hydrogen-enriched gas stream and a hydrogen-depleted gas stream, wherein the hydrogen-depleted gas stream comprises methane, optionally carbon monoxide and up to about 4 mol % hydrogen;

wherein, if the heating value of the hydrogen-depleted gas stream is less than 950 btu/scf (dry basis), and if the hydrogen-depleted gas stream comprises 1000 ppm or more of carbon monoxide: (1) at least partially separating carbon monoxide from the hydrogen-depleted gas stream to form (i) a carbon monoxide-enriched gas stream and (ii) a methane enriched gas stream having a heating value of at least 950 btu/scf (dry basis); or (2) at least partially methanating the carbon monoxide in the hydrogen-depleted gas stream to form a methane-enriched gas stream.

8. The process of claim 7, wherein the first carbonaceous feedstock and the second carbonaceous feedstock have substantially the same composition.

9. The process of claim 7, wherein the first carbonaceous feedstock and the second carbonaceous feedstock have different compositions.

10. The process of claim 7, wherein the first carbonaceous feedstock, the second carbonaceous feedstock, or both the first carbonaceous feedstock and the second carbonaceous feedstock are in a particulate form.

11. The process of claim 7, wherein the first carbonaceous feedstock is in the form of an aqueous slurry.

12. The process of claim 7, wherein the reactor is either a gasification reactor or an oxygen combustor.

13. The process of claim 7, wherein, in step (c), the steam is generated within the reactor.

14. The process of claim 7, wherein, in step (c), the heat energy is transferred to a heat exchanger which generates steam upon contact with water.

15. The process of claim 7, wherein substantially all of the steam generated in step (c) is introduced into the gasification reactor.

16. The process of claim 7, wherein the second gas stream comprises carbon monoxide, and the hydrogen-depleted gas stream comprises at least about 1000 ppm carbon monoxide.

17. The process of claim 16, wherein the carbon monoxide in the hydrogen-depleted gas stream is at least partially methanated to form a methane-enriched gas stream.

18. The process of claim 7, wherein the gasification catalyst is an alkali metal gasification catalyst.

19. The process of claim 18, wherein the alkali metal is potassium.

20. The process of claim 7, wherein the hydrogen is separated by passing the second gas stream through a hydrogen membrane separator.

* * * * *